(No Model.)

F. SINGRE.
POWER TRANSMISSION.

No. 542,428. Patented July 9, 1895.

Witnesses:
E. B. Bolton
E. A. Scott

Inventor:
François Singre
By [signature]
his Attorneys

UNITED STATES PATENT OFFICE.

FRANÇOIS SINGRE, OF PARIS, FRANCE.

POWER TRANSMISSION.

SPECIFICATION forming part of Letters Patent No. 542,428, dated July 9, 1895.

Application filed May 16, 1894. Serial No. 511,455. (No model.) Patented in France March 14, 1893, No. 228,602; in England September 16, 1893, No. 17,431, and in Belgium February 3, 1894, No. 108,385.

*To all whom it may concern:*

Be it known that I, FRANÇOIS SINGRE, a citizen of the Republic of France, and a resident of Paris, Department of the Seine, France, have invented certain new and useful Improvements in Power Transmission, of which the following is a specification.

Patents have been granted in France, No. 228,602, dated March 14, 1893; in England, No. 17,431, dated September 16, 1893, and in Belgium, No. 108,385, dated February 3, 1894.

My invention relates to the transmission of power by friction, and my object is to produce the necessary adherence or frictional contact between the friction-wheels without increasing the frictional resistance in the bearings.

The invention is shown in the accompanying drawings, in which—

Figure 1:
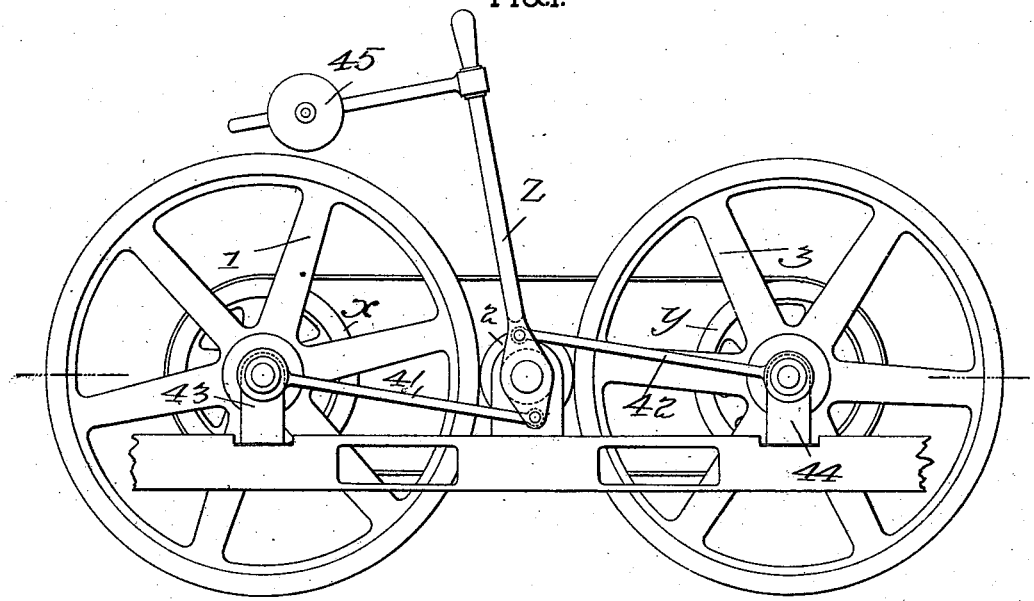
Figure 2:
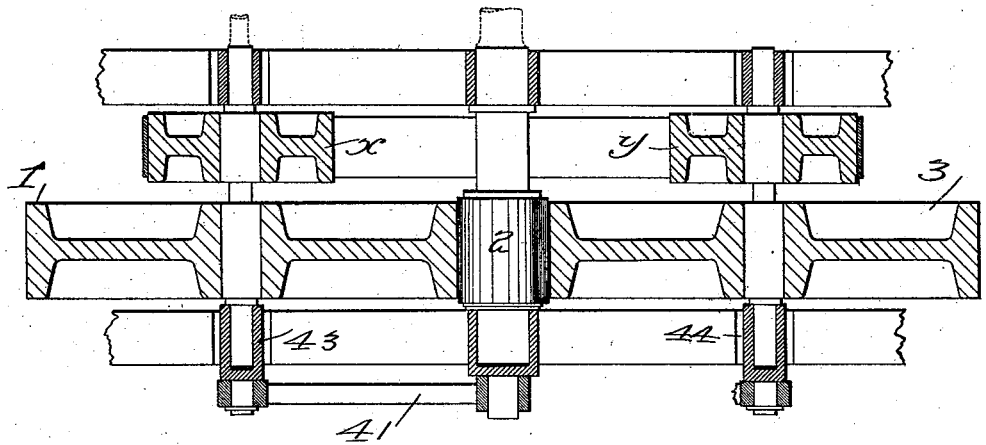

Figure 1 is a side view, and Fig. 2 a sectional plan view, of the invention.

1 and 3 are two friction-wheels, one of which must impart motion to the other by contact. 2 is the friction-roll, loose on its axis, if necessary. The roll 2 is mounted in an ordinary fixed bearing, while the wheels 1 and 3 are journaled in two movable bearings 43 and 44. By this arrangement the bearings 43 and 44 can move slightly in the line of the three centers. It is only as an example that I have shown the wheels 1 and 3 mounted in movable bearings, as either two of the axles of wheels 1 and 3 or roll 2 can be mounted in movable bearings with the same result.

A strap of elastic material serves to connect the two pulleys $x$ $y$ on the axles of wheels 1 and 3 by passing about the same, so that they move in unison. The strap performs the ordinary function of a power-transmission belt or strap, and it serves also to hold the friction-wheels in contact with the intermediate friction-roll, and as the wheel-bearings 43 and 44 are free to move, these parts are relieved from frictional resistance. The wheels 1 and 3 are maintained at a proper distance apart by the intermediate roll 2, which thus forms an outer friction-bearing for the wheels 1 and 3.

The journals of the wheels 1 and 3 are connected below and above the pivot of a lever $z$ by means of rods 41 and 42. By moving the lever $z$, either by hand or by means of a weight 45, more or less pressure may be obtained between the wheels 1 and 3 and the interposed roll 2.

I claim—

In combination, the two friction wheels, the movable bearings 43 and 44 therefor, the friction roll 2 bearing on the friction wheels and arranged between them, the lever pivoted axially of the friction roll, links connected to said lever, and to said movable bearings to adjust the pressure between the friction wheels and friction roll and means connecting the friction wheels to make them move in unison and under all adjustments thereof consisting of the elastic strap and the pulleys $x$—$y$ around which the elastic strap extends, substantially as described.

In testimony that I claim the foregoing as my invention I have signed my name, in presence of two witnesses, this 17th day of March, 1894.

FRANÇOIS SINGRE.

Witnesses:
 M. CORROYER,
 CLYDE SHROPSHIRE.